US007666456B2

(12) United States Patent  
Garwood

(10) Patent No.: US 7,666,456 B2
(45) Date of Patent: Feb. 23, 2010

(54) METHODS FOR SEPARATING TALLOW FROM BONELESS BEEF USING LIQUID CARBON DIOXIDE AND CARBONIC ACID

(75) Inventor: Anthony J. M. Garwood, Mercer Island, WA (US)

(73) Assignee: SafeFresh Technologies, LLC, Mercer Island, WA (US)

( * ) Notice: Subject to any disclaimer, the term of this patent is extended or adjusted under 35 U.S.C. 154(b) by 445 days.

(21) Appl. No.: 10/868,394

(22) Filed: Jun. 15, 2004

(65) Prior Publication Data

US 2005/0042346 A1 Feb. 24, 2005

Related U.S. Application Data

(63) Continuation-in-part of application No. PCT/US03/17643, filed on Jun. 3, 2003.

(60) Provisional application No. 60/561,128, filed on Apr. 9, 2004, provisional application No. 60/385,710, filed on Jun. 3, 2002, provisional application No. 60/388,067, filed on Jun. 10, 2002, provisional application No. 60/391,702, filed on Jun. 24, 2002, provisional application No. 60/411,138, filed on Sep. 16, 2002, provisional application No. 60/422,949, filed on Oct. 30, 2002, provisional application No. 60/424,388, filed on Nov. 5, 2002, provisional application No. 60/427,516, filed on Nov. 19, 2002, provisional application No. 60/429,644, filed on Nov. 25, 2002, provisional application No. 60/433,526, filed on Dec. 13, 2002, provisional application No. 60/438,546, filed on Jan. 7, 2003.

(51) Int. Cl.
*A23L 1/31* (2006.01)

(52) U.S. Cl. ............. 426/480; 426/641; 426/656; 426/574; 426/425; 426/437; 426/417

(58) Field of Classification Search ............. 426/480, 426/641, 656, 574, 425, 437, 417
See application file for complete search history.

(56) References Cited

U.S. PATENT DOCUMENTS 4,171,164 A  10/1979  Groves et al.

(Continued)

FOREIGN PATENT DOCUMENTS

DE  26 28 858 A1  12/1977

(Continued)

OTHER PUBLICATIONS

U.S. Appl. No. 11/911,338, Garwood. filed Apr. 13, 2005.*

(Continued)

*Primary Examiner*—Anthony Weier
(74) *Attorney, Agent, or Firm*—Christensen O'Connor Johnson Kindness PLLC

(57) ABSTRACT

A method includes combining ground beef with liquid that contains carbon dioxide. The ground beef and liquid are added to a vessel. The ground beef contains relative light and heavy components. The components that are predominantly lean beef will settle to the bottom of the liquid, and components that are predominantly fat will rise to the surface of the liquid. The separated components having predominantly lean beef can be removed from the liquid as a reduced fat ground beef product. The method can be practiced with any material containing fat, including plants and animals.

11 Claims, 7 Drawing Sheets

U.S. PATENT DOCUMENTS

| | | | |
|---|---|---|---|
| 5,147,672 A | 9/1992 | McLachlan et al. | |
| 5,378,418 A * | 1/1995 | Berger et al. | 264/83 |
| 5,393,547 A | 2/1995 | Balaban et al. | |
| 5,435,443 A | 7/1995 | Hohenester et al. | |
| 5,458,901 A | 10/1995 | Engler et al. | |
| 5,552,173 A | 9/1996 | Singh et al. | |
| 6,036,630 A | 3/2000 | Robey | |
| 6,123,945 A * | 9/2000 | Nakatsu et al. | 424/745 |
| 6,172,246 B1 | 1/2001 | Franke | |
| 6,224,930 B1 | 5/2001 | Inglis et al. | |
| 6,265,006 B1 | 7/2001 | Inglis et al. | |
| 2001/0007690 A1 | 7/2001 | Girsh | |
| 2002/0134317 A1 | 9/2002 | Shane et al. | |

FOREIGN PATENT DOCUMENTS

| | | |
|---|---|---|
| EP | 0 356 165 A1 | 2/1990 |
| GB | 357207 * | 7/1931 |
| JP | 58-21274 A | 12/1983 |
| WO | WO 03/101210 A1 | 12/2003 |

OTHER PUBLICATIONS

Spilimbergo, S., and A. Bertucco, "Non-Thermal Bacteria Inactivation With Dense $CO_2$," *Biotechnology and Bioengineering* *84*(6):627-638, Dec. 20, 2003.

* cited by examiner

METHODS FOR SEPARATING TALLOW FROM BONELESS BEEF USING LIQUID CARBON DIOXIDE AND CARBONIC ACID

CROSS-REFERENCES TO RELATED APPLICATIONS

This application claims the benefit of U.S. Provisional Application No. 60/561,128, filed Apr. 9, 2004. This application is a continuation-in-part of International Application No. PCT/US03/17643, filed on Jun. 3, 2003, which claims the benefit of Provisional Application Nos. 60/385,710, filed Jun. 3, 2002; 60/388,067, filed Jun. 10, 2002; 60/391,702, filed Jun. 24, 2002; 60/411,138, filed Sep. 16, 2002; 60/422,949, filed Oct. 30, 2002; 60/424,388, filed Nov. 5, 2002; 60/427,516, filed Nov. 19, 2002; 60/429,644, filed Nov. 25, 2002; 60/433,526, filed Dec. 13, 2002; 60/438,546, filed Jan. 7, 2003. All the above applications are herein expressly incorporated by reference in their entirety.

FIELD OF THE INVENTION

The present invention relates to the reduction in the tallow content and/or the separation of tallow and/or fat from materials, particularly in foods for human consumption, including beef.

BACKGROUND OF THE INVENTION

During the process of boning a carcass, and particularly a beef carcass such as a steer or cow, the tallow and fat often referred to as "trim," is removed. Other "trim" is cut from primal beef portions during the slicing and disassembly process of carcasses that is required during preparation of small cuts for human consumption. During these processes, a significant amount of lean beef can be cut from the carcass and carried away with the fat and/or tallow. Lean beef comprises predominantly muscle protein although some amounts of fat and tallow are present, while fat and tallow comprises predominantly glycerides of fatty acids with connective tissue and collagen and are the predominant constituents of plant and animal fat. The lean beef content in trim may be as high as 45% to 50% by weight. Presently, trim has little use except for sausage production, or alternatively the fat may be rendered. The value of lean beef in the trim is therefore relatively low compared to boneless beef having a reduced fat content of just 15% by weight, for example. The value of 50% lean beef trim is perhaps in the order of 35 cents per pound compared to perhaps about $1.10 for 85% boneless lean beef. It is therefore desirable to separate the lean beef from the trim so as to reduce the fat content but without increasing the natural proportion of connective tissue and collagen.

In one conventional method to recover the lean beef, the trim can be heated to about 109° F. The heated trim can then be processed in a centrifuge that separates the fat only from the lean beef. For many years, in fact since the earliest point in time when low fat ground beef came into popular demand, beef processing companies have sought methods to effectively separate ground tallow and fat from ground beef. Fat on the one hand is a beef component that comprises a substantial part of tallow. However tallow includes proportions of fat and collagen with small quantities of connective tissue. If fat alone is removed from ground beef then the proportion of collagen, fat, connective tissue and lean beef will not be the same as the natural proportions. In order to maintain ground beef with natural proportions of lean beef, connective tissue, collagen, and fat it is desirable that the natural relative proportions of fat, collagen and connective tissue which comprise tallow are separated proportionately and in fact in quantities equal to those contained in tallow. Therefore by separating lean beef from tallow in the manner according to the invention, the natural proportions as required by USDA can be maintained. The method of the invention described herein below is in distinct contrast to the only other method practiced presently in the beef industry. The present invention enables separation of fat from ground beef such that after separation, the lean ground beef portion displays a bright cherry red color preferred by the typical consumer, while said portion of ground beef comprises natural proportions of lean beef, fat, collagen and connective tissue. The other method briefly described herein, wherein the temperature of the lean beef is elevated to a point where beef fat melts and becomes oil-like enabling separation of the fat and oil only such that collagen and connective tissue, that should be removed with the fat, remains together with the lean beef portion. Following the separation, the method practiced by, for example BPI of Dakota Dunes, S. Dak., the lean beef which contains a greater proportion of collagen and connective tissue compared with the natural proportions of natural ground beef is then frozen and chipped into small flakes. This finished product, known as lean finely textured beef (LFTB), as herein above explained, is then stored in a frozen condition and can later be added to ground beef. The temperature of the LFTB during the separation process does not exceed the temperature that a carcass would normally experience post mortem. As a result, pathogens and bacteria that are present on the surfaces of the carcass can result in bacteria being present in the LFTB. Additionally, the method of heating and centrifuging requires that the trim be shipped from the beef packing facility to an outside facility and then returned to the packer at a significant expense and which furthermore can also enhance viability and increased population of pathogens.

A need therefore exists to more efficiently separate the lower value tallow with fat from the higher value lean beef contained in trim and to more effectively kill, reduce or completely remove the microbial pathogen population and to eliminate sources of cross contamination and recontamination. In particular the substantially complete killing of all pathogens such as $E.\ Coli$ 0157:H7 that can be present in trim, is desirable and this can be achieved with the appropriate manipulation of the multiple natural phases of carbon dioxide by exposure of trim thereto, according to the disclosure as set out below.

SUMMARY OF THE INVENTION

Beef tallow comprises natural proportions of beef fat, collagen and connective tissue while beef fat is a single component contained within beef tallow. The invention disclosed herein describes a method and apparatus for separating tallow with fat contained in the tallow from ground beef. The method includes combining ground beef with liquid that comprises carbon dioxide and/or water. The ground beef and liquid are transferred together into to a vessel. The ground beef and the liquid are agitated in the vessel. The ground beef comprises relative light and heavy components. The heavy components that are predominantly lean beef can then settle to the bottom of the liquid, and the light components that are predominantly tallow and fat can rise toward the surface of the liquid. The separated components comprising predominantly lean beef can be removed from the liquid as a reduced tallow and fat content ground beef product. The method can be practiced with any material containing fat, including plants and animals.

The liquid can include carbon dioxide and water. The liquid has a pH of about 3 or higher or even lower, such that when the beef is blended in the liquid for a period of time, any bacteria that is present at the beef surfaces is either killed or injured. Furthermore, the processing of the beef in a substantially all carbon dioxide environment extends the shelf life of beef.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is an illustration of the cross section of the apparatus of FIG. 6; and

DETAILED DESCRIPTION OF THE PREFERRED EMBODIMENT

The term "fat" as used herein can mean fat and tallow when used in reference to animal matter such as ground beef.

Figure 1:
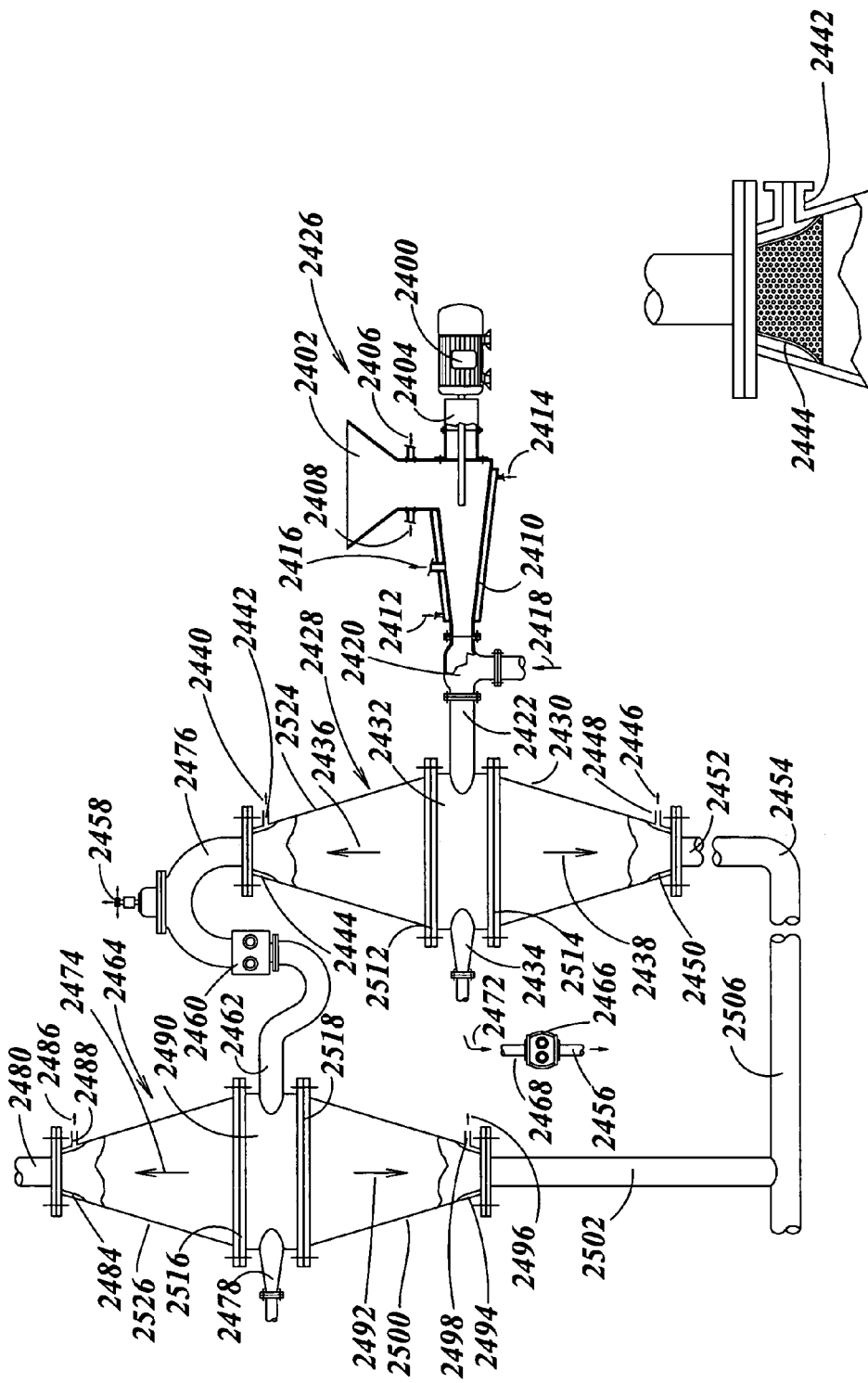
FIG. 1 is an illustration of an apparatus for separating fat from a material according to the present invention.
Figure 2:
FIG. 2 is a cross-sectional illustration of a vessel portion of the vessel 2428 of FIG. 1.

Referring to FIGS. 1 and 2, one embodiment of an apparatus for the separation of fat from a material according to the respective densities of fat and reduced-fat material, is provided. The apparatus includes a grinder 2426, a mixer 2420, and two separation vessels 2428 and 2464, connected in series, and related connecting conduits between each apparatus component. Each vessel 2428 and 2464 has at least an inlet for material containing fat, and liquid used in the separation of the fat. Each vessel 2428 and 2464 has at least two outlets, one for the separated fat and one for the reduced fat material. "Fat" may be any plant or animal fat. Animal fat may include animal tallow and fat. "Reduced fat material" can be the material remaining after some of the fat and/or tallow has been removed. The material can be animal or plant tissue, such as muscle, carbohydrates, sugars, etc. Each vessel 2428 and 2464 has outlets for liquid used in separating fat. A representative material from which fat is separated, is beef comprising predominantly tallow and fat with lean beef, such as the trim from a cow carcass.

In the process of separating fat, the vessels 2428 and 2464 are filled with liquid and a material comprising tallow and fat, wherein the material, such as beef, has been ground into smaller pieces, wherein some of the pieces will inevitably be predominantly tallow and fat and some of the pieces will be predominantly lean beef pieces. It is to be appreciated that even pieces of lean beef will have some tallow and fat. Pieces of material with or without tallow and fat are referred to as components of the material. Tallow and fat and lean beef also may comprise the other components of ground beef. Separation of tallow and fat in liquid takes place by settling of the higher density components that are predominantly lean beef to the bottom of the vessels and flotation of the lower density components that are predominantly tallow and fat to the surface of the liquid. Accordingly, each respective component, whether predominantly tallow and fat or lean beef, will stratify according to the density of the component and the density of the liquid. Once components are separated into strata, each respective stratum can be collected and transferred through a conduit at the top or bottom of each vessel. Liquid is removed from the stratum either before or after leaving the vessel, and tallow and fat product and lean beef product are collected. Each stratum will comprise respective components of tallow and fat and lean beef. It is to be appreciated, however, that material pieces may simultaneously comprise tallow and fat and lean beef, the relative proportions will determine whether the material piece will be buoyant or sink in the liquid. Some material pieces may be neutrally buoyant and neither readily float nor sink and stay generally in the middle level of the liquid. The neutrally buoyant pieces may be removed through a mid-level outlet on the vessel and recycled or alternatively ground into smaller pieces and recycled through the separation vessel.

Referring to FIG. 1, grinder pump 2426 that can be pump Model No. 1109, from Weiler is provided with a hopper 2402. A motor 2400, drives a screw (not shown) located within grinder pump 2426, via a gearbox 2404 to direct beef with tallow and fat through a grinding plate which may have grind apertures about 1 inch in diameter. Grinding advantageously increases the overall surface area of the ground beef and increases separation efficiency. The grinding plate is located between a mixing chamber 2420 and grinder pump 2426. The grinding plate is not shown. A material comprising fat is introduced into hopper 2402. The material can be the "trim" of carcasses from a slaughterhouse or any beef production facility. However, it is possible that other materials can be used, including nuts, vegetables and fruits. A gas, such as carbon dioxide, or a blend of gases with carbon dioxide, is injected into hopper 2402 through ports 2406 and 2408 located in proximity to the entrance to hopper 2402. Such gas is provided at a pressure and volume that can displace air from hopper 2402. A vent port 2416 further downstream in grinder pump 2426 allows any excess gas to escape. The vent port 2416 may be fitted with a valve to control the flow and/or pressure of escaping gas. Gas injection before grinding advantageously displaces air that would otherwise result in increased absorption of oxygen into the material due to the increase in surface area as a result of grinding. The delivery of the material pieces after grinding into an environment low in oxygen is also beneficial. Oxygen can be detrimental to beef as the oxidation of fat leads to rancidity and a relatively shorter shelf life of beef. The entire process of fat and tallow separation can be performed under reduced oxygen conditions that advantageously delay the onset of rancidity.

A water jacket 2410, around the exterior of the portion of the grinder 2426 housing the screw, provides for the ability to heat and/or cool the grinder pump 2426 and its contents. Temperatures can be adjusted in the range from about 24° F. (−4.4° C.) to about 110° F. (43.3° C.). An inlet port and outlet port, 2412 and 2414, respectively, for addition of a temperature control medium into and out of the jacket 2410, are provided on the grinder pump 2426. The purpose of the jacket 2410 is to adjust the temperature of the grinder screw housing in such a way that heat transfer will adjust the temperature of the material as it is transferred along the screw within the grinder pump 2426. Any suitable medium, such as glycol, may be used as a heat exchange medium.

The ground material including fat is transferred from grinder pump 2426, through the grinding plate at the end of grinder pump 2426, and into the mixing chamber 2420 where the ground material is mixed with a liquid. The liquid 2418, comprising a blend of liquid carbon dioxide and water, is combined with the material in mixing chamber 2420. Additionally, liquid 2418 can comprise carbon monoxide and carbon dioxide gas. The liquid can be blended with the material at a pressure of about 280 psia (1931 kPa) to about 2500 psia (17237 kPa). At such pressures, liquid carbon dioxide can have a pH of about 3. When combined with the material, the pH may drop to less than 2 and will therefore assist in the decontamination of the material. The reduction in pH can occur as a consequence of sodium ions that are present in the form of sodium chloride in the material. Sodium chloride or any other salt, including sodium chlorite, may be added with the material or liquid. Another benefit of adding a salt is to make corrections in the density of the liquid carbon dioxide that effects at what point the separation will occur. The density of the liquid determines which pieces of material will float and which pieces will sink. If the density of the liquid is close to the density of fat, then only the components nearly completely of fat will rise and all the other components will sink in the liquid. By contrast, if the density of the liquid is close to the density of lean beef, for example, than only the components nearly completely of lean beef will settle to the bottom of the liquid. The density of the liquid can be adjusted to any density between and including the density of fat and lean beef (or whatever the material).

The quantity of ground material transferred into mixing chamber 2420 may be at any flow rate. The flow rate of the liquid carbon dioxide with water may be a flow rate that is a multiple of the material flow rate, and can be about one-half to about four times the flow rate of the material stream. The amount of added liquid carbon dioxide can be about 3 to about 5 times the weight of the material, and the amount of added water can be about 2% to about 3% of the material, by weight. The ground material and liquid are transferred along the conduit 2422 from mixer 2420 to first separation vessel 2428.

First separation vessel 2428 comprises a centrally disposed tube section 2432, an upper cone section 2524, and a lower cone section 2430, wherein both cone sections attach to the central tube section 2432 at flanges 2512 and 2514, respectively, in a pressure tight manner. The upper, interior end of cone 2524, includes an annular space, defined by a annular perforated wall 2444 located interior to the wall of cone 2524, wherein the annular space is emptied through port 2442 that is in communication with the annular space defined by the perforated wall 2444 and the cone wall 2524, as detailed in FIG. 2. In this manner, depending on the size of the perforations, liquid and fine particles 2440 may be removed from the upper cone of vessel 2428 that pass through the perforations and are carried away via port 2442, but bulkier material will not pass through the perforations.

Similarly, at the lower, interior end of lower cone 2430, an annular space is defined by an interior perforated wall 2450 and the cone wall, wherein the annular space is in communication with port 2448 for the removal of liquid 2446 or fines.

In the first vessel 2428 and in any vessel described herein, the densities of pure fat and pure lean beef are different and the differences in density can be used to separate the components according to fat content in vessel 2428 and in subsequent vessel 2464. The density of material components comprising predominantly fat will be less than the density of liquid carbon dioxide, and the density of material components comprising predominantly lean beef will be greater than the density of liquid carbon dioxide. Therefore, the material components will separate according to whether fat or lean beef is the predominant component. Material 2436 that is lighter than the liquid will move upward in cone 2524, and material 2438 that is heavier than the liquid will move downward in cone 2430. The density of liquid carbon dioxide may be adjusted (elevated) to provide for more or less separation by adding sodium chloride, sodium chlorite, or any other suitable salt. For example, sodium chloride may be added to the carbon dioxide and water to adjust the density to be substantially the same or slightly less than lean beef. In this way, only the material that is very high in lean beef will settle to the bottom of the vessel and corresponding material that has high amounts of fat can separate more rapidly. Additionally, temperature and/or pressure of the liquid carbon dioxide may be adjusted to set the desired density at which some components will rise and others will sink. Separating the heavier material comprising predominantly lean beef from the liquid can be achieved by extracting the liquid 2446 through the perforated wall 2450 in the lower end of the cone 2430 through port 2448. Similarly, liquid 2440 can also be extracted through port 2442 at the upper end of cone 2524.

Additionally, liquid can be extracted through manifold 2434 that is in communication with the central tube section 2432. The total amount of liquid extracted via ports 2442, 2448 and manifold 2434, can be about equal to the volume of liquid blended with the material in mixing chamber 2420. The lighter material that comprises predominantly fat components is transferred upwardly and into conduit 2476 that is connected to the vessel outlet of the upper cone section 2524, and the heavier material that may comprise predominantly lean beef components will be transferred into conduit 2452 that is connected to the vessel outlet at the bottom of lower cone 2430. Conduit 2452 continues into conduits 2454 and 2506, where it connects with conduit 2502 that is connected to the lower cone of the subsequent separation vessel 2464. It is to be appreciated that not all liquid may be removed from the respective components at the upper and lower ends of vessel 2428 and such liquid may be removed at a later stage.

Conduit 2476 that is connected to upper outlet of vessel 2428 can have a pressure relief valve 2458 at the uppermost location. Pressure relief valve 2458 can enable the venting of excess gas from vessel 2428 according to the pressure relief valve setting. A second grinder/pump 2460 can be located between conduit 2476 and conduit 2462 leading to the second separation vessel 2464. Pump/grinder 2460 is arranged to grind the lighter material collected through conduit 2476, with a grind size of less than one-half inch, for example, to produce further smaller pieces of material that may either comprise predominantly fat or predominantly lean beef or about equal proportions of fat and lean beef. However, after the first vessel, it is expected that the majority of the pieces will be predominantly fat. After the second grinding, the material pieces are transferred through conduit 2462, and into central tube section 2490 of vessel 2464. Additional liquid may be added with material passing through conduit 2462 and into vessel 2464 to fill the vessel 2464 with liquid to carry out separation if a substantial amount of liquid has been removed through port 2442.

Second separation vessel 2464 includes an annular central tube section 2490 attached to an upper cone 2526 and a lower cone 2500, at flanges 2516 and 2518, respectively. Heavy material components 2492 that may comprise predominantly lean beef transferred from conduit 2462 into vessel 2464 will travel downwardly into lower cone 2500, and light components 2474 that may comprise predominantly fat will travel upwardly into upper cone 2526. Upper cone 2526 has an upper outlet connecting to conduit 2480. Light material 2474 (tallow) leaving through conduit 2480 can be considered a waste stream that can be transferred to a rendering plant. Upper cone 2526 has an interior perforated wall 2484 that defines an annular space that is in communication with port 2488 in order to extract liquid 2486.

Heavy material 2492 is transferred from lower cone 2500 of vessel 2464 through conduit 2502 where the material 2492 is combined with material 2438 from vessel 2428. Heavy material comprising predominantly lean beef transferred through conduit 2502 from vessel 2464, and conduit 2452 from vessel 2428 are combined together in conduit 2506. The combined product, now high in lean beef and low in fat, can be incorporated in the production of ground meat and sold at a higher price compared to the trim that is fed to hopper 2402 at the start of the process. Such process can turn an otherwise low value product (trim) into a high value product (lean ground beef) in an economical manner that additionally will decontaminate the lean ground beef due to its exposure to low pH carbon dioxide. The product will have the natural proportions of lean beef, fat, collagen and connective tissue.

Lower cone 2500 is similarly provided with an annular perforated wall 2494 in the interior and at the end of the cone 2500 for the removal of the liquid 2496 through port 2498.

Liquid transferred with the material or added separately into vessel 2464 can be extracted, in addition to ports 2488 and 2498, through manifold 2478 connected to central tube section 2490. Liquid extracted through ports 2442, 2448, 2488, 2498 from the annular spaces of both vessels 2524 and 2464, and from manifolds 2478 and 2434, can be combined as liquid 2472 and directed toward a common conduit that leads to conduit 2468 connected upstream of a compressing pump 2466. The combined liquid 2472 is delivered through downstream conduit 2456 to a conditioning area that processes the liquid in order to be recycled and reused. Liquid thereby collected and transferred through conduit 2456 can be filtered, adjusted to have a certain temperature and pressure, and then transferred and measured for reuse in mixing chamber 2420 with new material, or recycled liquid can be fed at any other location, including to vessels 2428 and 2464.

Valves and pressure release valves can be provided on all ports, vessels and conduits. All such valves and pressure release valves are arranged to open and close in a manner allowing transfer of material and/or liquid therethrough at selected flow rates wherein the valves can be automated and controlled by a computer to effectively monitor and automatically control the process at desired conditions.

Liquids for use in the present invention to separate light material comprising predominantly fat component from heavy material comprising predominantly lean beef component may include liquefied or vaporized gas or a blend of liquefied or vaporized gases including carbon dioxide and/or any atmospheric gas(es), including carbon monoxide, ammonia or any other gas. Additionally, the liquid may comprise water or processing aids including sodium citrate, sodium chlorite, tri-sodium phosphate and sodium chloride and any combination thereof, which may be dissolved in water (or carried as a suspension therein), and that can be mixed with any liquefied or vaporized gas or gases. Liquids can be controlled at a selected pressure and/or temperature to lower or raise the density of the liquid to effect separation of a relative light material from a relative heavy material. In most cases, for example, material comprising predominantly fat component will separate from material comprising predominantly lean beef component. However, since the separation point is adjustable, it is feasible, and may even be desirable, under some circumstances, that material comprising predominantly fat component will occasionally be the heavy material, and occasionally the material comprising predominantly lean beef will be the light component. The separation point is adjustable according to the demands of customers either wishing extremely pure lean beef or beef where more than the majority is fat, or any fat percentage between the extremes, and the density of the liquid carbon dioxide can be adjusted by controlling the temperature and/or pressure within a separation vessel. Separation can occur continuously in a continuous flow-through process or can be done in a batch type process.

Figure 3:
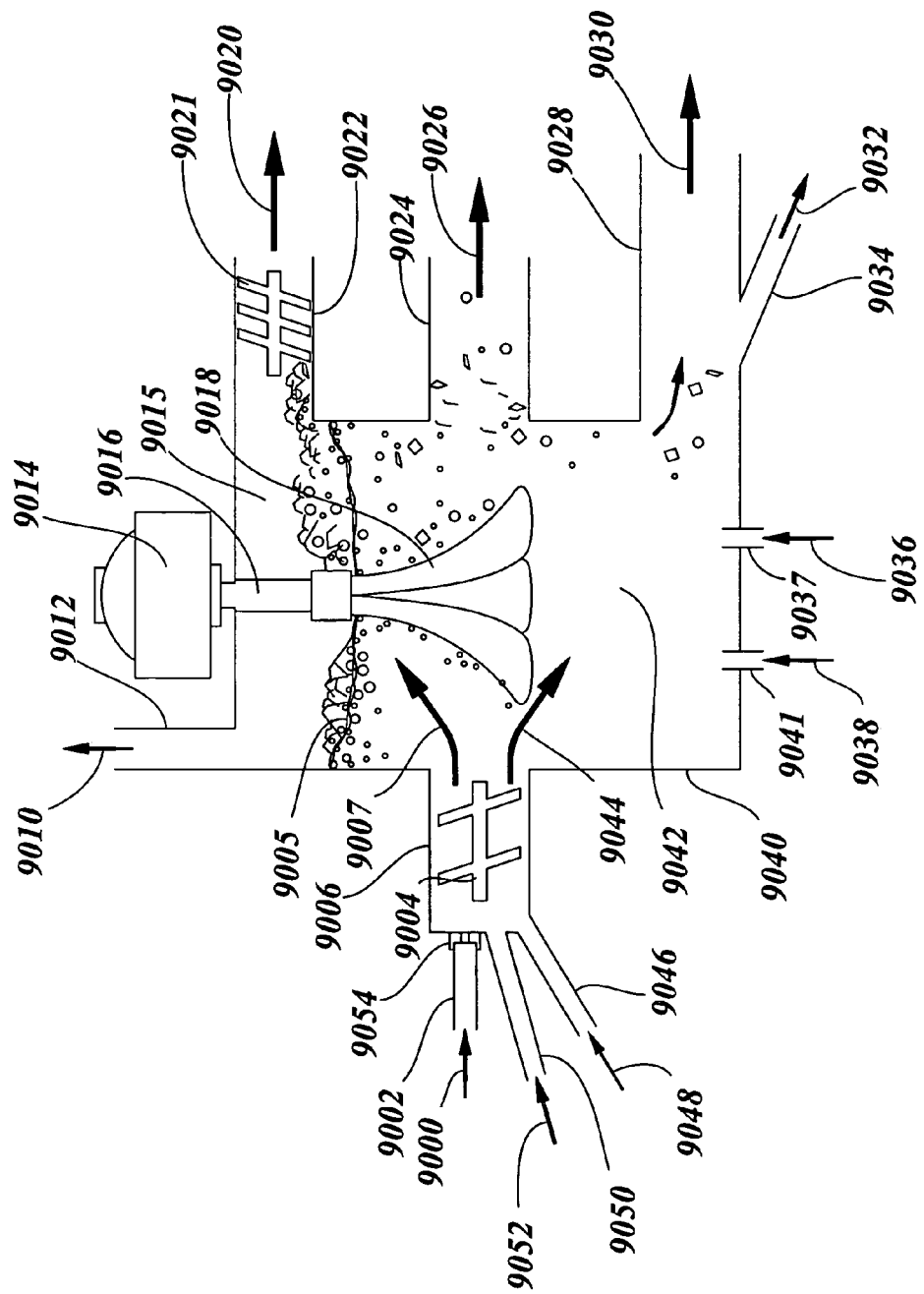
FIG. 3 is an illustration of an apparatus for separating fat from a material according to the present invention.

Referring to FIG. 3, apparatus comprising a separation vessel 9040 designed to enable the separation of fat and lean beef from a continuous or semi-continuous material stream comprising boneless beef wherein the fat content of the boneless beef is higher than the lean beef content, is illustrated. For example, the percentages of lean beef and fat can be about 40% and about 60% by weight, respectively. As with the apparatus shown in FIG. 1, the apparatus of FIG. 3 can rely on the respective densities of fat and lean beef to cause separation of components comprising both at differing proportions within a liquid in vessel 9040.

A continuous stream of boneless beef 9000 and fat is pumped at a selected pressure and mass flow rate through conduit 9002 that leads to a grinder 9054 wherein a blade, as is typical of beef grinding mechanisms, rotates while in contact with a grinding plate. The grinder blade is located either on the inside of the grinding plate or on the outside or exit side of grinding plate, such that the material stream of beef pumped through grinding plate is cut into pieces of a specified predetermined smaller size than the beef coming into the grinder 9054. The smaller pieces of boneless beef material are transferred into the horizontally disposed conduit 9006. Liquid 9052 comprising carbon dioxide is transferred through conduit 9050 into conduit 9006 that mixes with the ground boneless beef pieces to inhibit contact between the pieces of ground beef. Water 9048 is pumped into conduit 9006 from conduit 9046. Pumps (not shown) that can be used to transfer water, liquid carbon dioxide, and boneless beef can be the positive displacement type that enable control of the mass flow and pressure of each stream. The temperature and pressure is approximately the same for all streams transferred into conduit 9006, which may be in the range of about 24° F. (−4.4° C.) to about 110° F. (43.3° C.), but preferably is about 30° F. (−1° C.) to about 40° F. (4° C.), and at a pressure in the range of about 280 psia (1931 kPa) to about 2500 psia (17240 kPa). The mass flow of liquid carbon dioxide and water can be controlled such that the volume and/or mass flow of each can be proportional to the mass or volume flow of the beef. For example, for each cubic foot of boneless beef, there can be approximately 4-6 cubic feet of liquid carbon dioxide, and approximately 2% to about 3% by weight of water. The pressure and temperature of liquid carbon dioxide can be such that the density of the liquid carbon dioxide can approximately equal the density of water, i.e., about 62.4 lbs./cubic foot. At a density slightly less than water, the water will displace any liquid carbon dioxide that may otherwise fill in the voids in the lean beef components that are removed from the bottom of the vessel.

The density of liquid carbon dioxide will vary according to temperature and/or pressure, and therefore temperature and/or pressure transmitters or other such suitable measuring devices can be strategically located in the process to enable the accurate measuring of the temperature and pressure of the contents within conduit 9006 and vessel 9040 to determine and/or control the density of liquid carbon dioxide.

Pressure vessel 9040 is arranged in a generally vertically disposed position with the horizontally disposed inlet conduit 9006 connected approximately at the mid-level height on vessel 9040. Impeller 9004 connected to a suitable driver (not shown) may be located within conduit 9006 so as to enable a controlled speed of rotation to adjust the transfer of the blended streams of ground beef, liquid carbon dioxide and water, without disturbing stratification of the fat and lean beef components in vessel 9040. The density of fat is approximately 56 pounds per cubic feet. The density of lean beef is approximately 66 pounds per cubic foot, and the density of carbon dioxide at 4° C. and 850 psig (and/or water) is approximately 62.4 lbs. per cubic foot. Therefore, components comprising predominantly fat will tend to stratify at a higher level in vessel 9040 than the components comprising predominantly lean beef when blended and allowed to separate for an adequate amount of time and within an adequate quantity of liquid carbon dioxide. In the present invention, liquid carbon dioxide at a density similar to the density of liquid water is provided in vessel 9040 to substantially fill the vessel 9040. Vapor space 9015 above the level of liquid carbon dioxide in vessel 9040 may contain carbon dioxide gas such that the liquid and gaseous carbon dioxide exist at the same pressure within vessel 9040. Excess carbon dioxide gas 9010 may be removed from vessel 9040 at a controlled flow rate through conduit 9012. A valve (not shown) can be installed on conduit 9012 to provide for flow control out of and/or pressure control of vessel 9040. Optionally, a computer, which is programmed with code can automatically enable control of all valves, blending impellers, pumps and injectors to control the process parameters at desired setpoints and to automate the process. Valves and positive displacement pumps are installed around vessel 9040 such that a computer will enable, as much as possible, the automatic production of lean beef and fat.

Impeller 9018, mounted to vertically disposed shaft 9016 and attached to drive motor 9014, is provided within the interior of vessel 9040 to enable a gentle agitation of the contents within vessel 9040.

At least three conduits are provided for the removal of material from vessel 9040, respectively, at the upper and lower sections and at the mid-level section of the vessel 9040.

Conduit 9022 is located in the upper section of vessel 9040 and is disposed horizontal to vessel 9040 to enable removal of light components 9020 that rise to the surface of the liquid 9042. Conduit 9028 is located at the lower section of vessel 9040 and is disposed horizontal to vessel 9040 to enable removal of heavy components 9030 that settle to the bottom of the liquid 9042. Conduit 9024 is provided at approximately the mid-level height of vessel 9040 to allow extraction of liquid carbon dioxide 9026 at a selected mass flow rate. Outlet to conduit 9024 is provided at a location that will generally be above the stratum comprising predominantly lean beef and below the stratum comprising predominantly fat or anywhere in between so as not to substantially remove either the heavy or light components. Conduit 9024 can be connected to conduit 9050. Liquid carbon dioxide 9026 extracted through conduit 9024 by a positive displacement pump can be recycled to conduit 9050 at a substantially higher flow rate than the mass flow rate of boneless beef pumped into vessel 9040.

Impeller 9021 is optional and may be installed in conduit 9022, and similarly in conduits 9024 and 9028. Impellers located within such conduits operate to transfer material out of vessel 9040 at a desired flow rate. Positive displacement extraction pumps may also be located in conduits to and out of vessel 9040.

Light components with a density less than the density of the liquid 9042 within vessel 9040, will rise toward the surface 9005 of the liquid in the direction shown by arrow 9007. Light components 9020 having been separated from heavier components 9030, can be extracted via conduit 9022.

Heavy components with a density greater than the density of the liquid 9042 within vessel 9040, will settle downwardly in the direction shown by arrow 9044. Heavy components 9030 having been separated from lighter components 9020, can be extracted via conduit 9028.

Bottom injection ports 9041 and 9037 are provided on vessel 9040 to enable injection of additional carbon dioxide liquid 9038 and 9036 at a selected temperature and pressure. Conduit 9034 is provided to enable extraction of any foreign objects 9032, such as sand. Conduit 9034 is located on a lower section of vessel 9040 and branches from conduit 9028.

The combined mass flow rate of all streams pumped via conduits 9006, 9041 and 9037 into vessel 9040 are substantially equal to the combined mass flow rate extracted via conduits 9022, 9024, 9028, 9012 and 9034. Valves and positive displacement pumps can be provided at each conduit 9022, 9024, 9028, 9012 and 9034. The sum of all extracted streams can be controlled by a computer so as to maintain the selected pressure and temperature in vessel 9040 at such setpoint that will enable the desired separation efficiency of heavy and light components. In most but not all cases, heavy components are predominantly lean beef and light components are predominantly fat. For example, the fat extracted via conduit 9022 may be approximately 99% fat by weight, whereas the lean beef extracted via conduit 9028 may be approximately 80% lean beef by weight and approximately 20% fat by weight. The apparatus shown in FIG. 3 can be controlled to achieve such fat and lean beef percentages, separated into two or more material streams derived from a single stream of boneless beef.

Conduits 9002, 9050, 9046, 9041 and 9037 can be fitted with valves and/or pumps controlled by a computer which likewise can also control valves and/or positive displacement pumps provided in conduits 9012, 9022, 9024, 9028 and 9034 such that input streams can be balanced against exit streams so as to enable optimized efficiency in operation of the equipment. Such equipment may be built so as to enable the processing of an input material stream of boneless beef at a mass flow rate of approximately 15,000 lbs./hour, and the separation of the input stream into two or more output streams wherein one of the output streams comprises greater than about 90% by weight fat and a second output stream comprises about 50% to about 99.5% by weight lean beef. It should be noted that the adjustment of the conditions of carbon dioxide wherein the density is manipulated to enable the effective separation of fat from lean beef can occur through measuring temperature and pressure in vessel 9040 and adjusting one or both of these parameters to achieve a desired density of liquid carbon dioxide.

The computer control system can be interfaced directly with one or more other computers, all computers being connected to a common communication system that enables computers to transmit and receive information from all other computers connected to the common communication system. Information can be received from customers of ground beef on a real time basis to provide production control according to purchase orders received from customers. Such customers may be supermarkets that send purchase orders for ground beef (and other meat products) according to their requirements, including specifications for the type of packaging, the fat content of product, the delivery location and lead time to delivery plus any other typical specifications of meat products required by supermarkets. Such purchase orders may not only be received with a short delivery time, but purchase order cancellations occur and changes in purchase orders already received by the meat packer can be challenging to fulfill. The computer controlled system as described herein can be interfaced directly with incoming information to increase or decrease any property of the production product at any time, and this control system can efficiently accommodate for fluctuations required as a consequence of purchase order changes.

Figure 4:
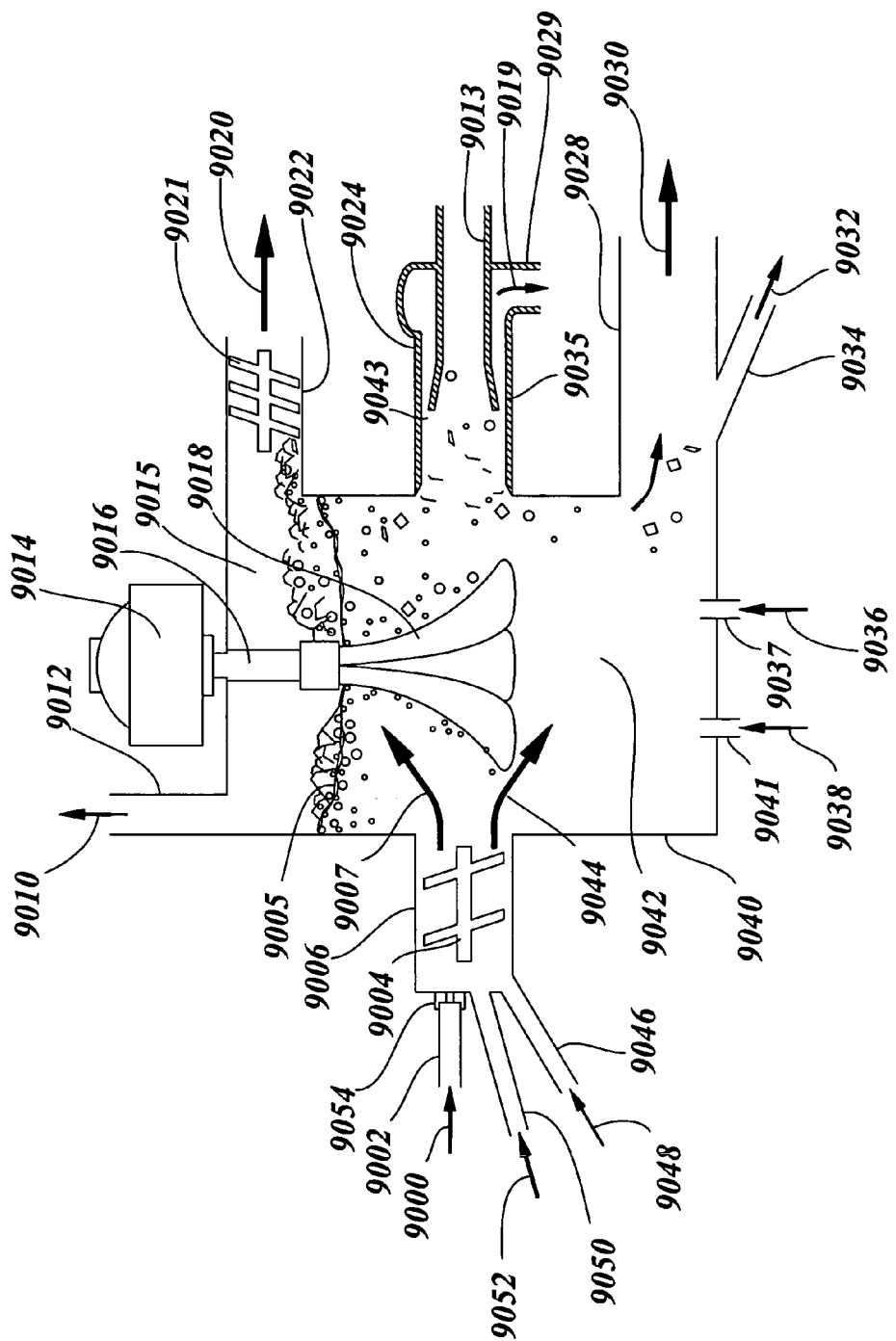
FIG. 4 is an illustration of an apparatus for separating fat from a material according to the present invention.

Referring to FIG. 4, a different embodiment of vessel 9040 is illustrated. The embodiment shown in FIG. 4 is similar to the embodiment shown in FIG. 3, other than the differences noted and described below. Accordingly, the same reference numerals are being used to identify similar apparatus components in both embodiments. In FIG. 4, a centrifuge 9035 is illustrated as being located within conduit 9024 enabling the separation of materials that reside in the location that is approximately in the middle of vessel 9040 and that do not readily rise to the liquid surface or settle to the bottom. Centrifuges separate according to the density of the materials. The higher density components will be flung out farther by centrifugal force than the less dense components. The most dense components, being predominantly lean beef, can thusly be separated by accumulation against the inner side of outermost wall 9043 of centrifuge 9035. Lower density components, being predominantly fat, accumulate in a substantially central location in conduit 9013 of the centrifuge 9035. As the materials are processed in the centrifuge 9035, lean beef 9019 can be extracted via conduit 9029 and combined with other lean beef from conduit 9028, and fat can be extracted from conduit 9013 and combined with fat from conduit 9022. Valve means or positive displacement pumps can be installed in respective conduits 9029 and 9013 to enable mass flow control of fat and lean beef. Valve means and positive displacement pumps located on conduit 9029 and 9013 to control transfer of processed materials can be controlled by the computer control system described above.

Figure 5:
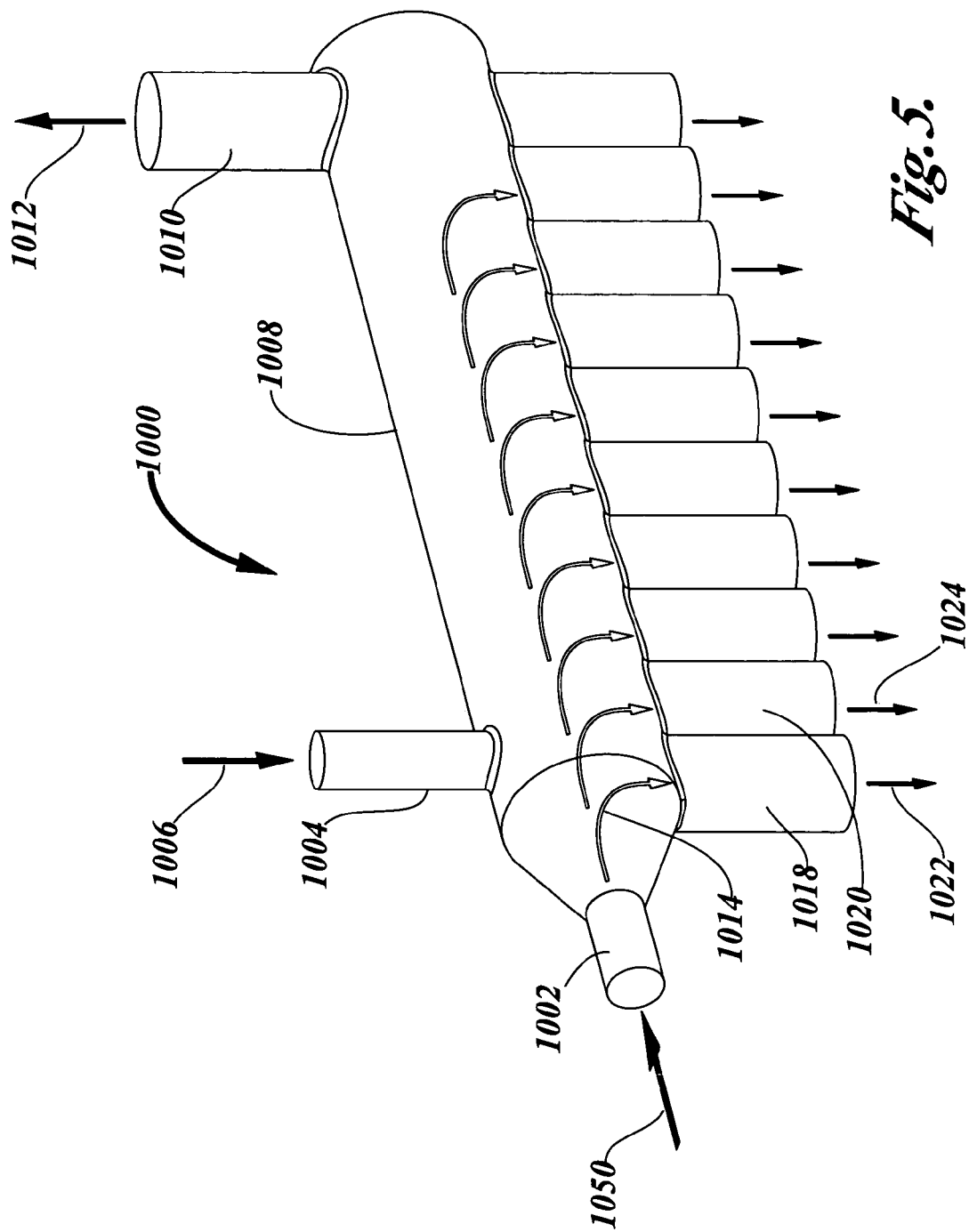
FIG. 5 is an illustration of an apparatus for separating fat from a material according to the present invention.

Referring to FIG. 5, another embodiment of an apparatus 1000 for the separation of fat from a material is illustrated. As with the previous embodiments, the separation of fat relies on the respective densities of fat and liquid carbon dioxide to cause separation.

A separation vessel 1000 includes a tubular conduit 1008 having an entrance on one end that is in alignment with the horizontally disposed conduit 1008. Entrance nozzle 1002 is for the injection of a material 1050 comprising fat. Inlet nozzle 1004 disposed at the top of conduit 1008 and near the entrance nozzle 1002 is provided for the injection of liquid carbon dioxide 1006, optionally including water also. Conditions within tubular conduit 1008 can be at a pressure of about 250 psia (1724 kPa) to about 3000 psia (20680 kPa) and at a temperature of about 30° F. (−4° C.) to about 50° F. (10° C.). Liquid carbon dioxide substantially fills the tubular conduit 1008. Liquid carbon dioxide density within tubular conduit 1008 can be controlled through pressure and/or temperature adjustment so that respective light or heavy components will either settle to the bottom of tubular conduit 1008 or rise to the surface of the liquid carbon dioxide. A pump can be provided at the entrance nozzle 1002 to propel the material into the tubular conduit 1008. Preferably, material 1050 has been reduced to smaller pieces, wherein components include light and heavy components. A light component is a component that will rise toward the surface of liquid within the tubular conduit 1008, and a heavy component is a component that will sink toward the bottom in the liquid within the tubular conduit 1008. The separation vessel 1000 includes a plurality of outlet conduits, of which the first two outlet conduits 1018, 1020, are representative. Such outlet conduits are located in series along the lower section of the tubular conduit 1008. As the liquid carbon dioxide and material travel along the interior of the conduit 1008, the densities of the respective components are such that light components will rise in the liquid, and the heavier components 1014 will sink towards the bottom of the conduit 1008 and be removed from the conduit 1008 by the series of outlet conduits located along the lower section of the tubular conduit 1008. Since it is expected that the material components will have a range of fat from essentially 0% fat to 100% fat, those components 1022 comprising the least amount of fat will be removed by the first outlet conduit 1018. Components 1024 with slightly more fat than components 1022 will be removed through the next outlet conduit 1024 in the series, and so on for the remainder of the bottom outlet conduits. Components progressively higher in fat but still capable of sinking in liquid will be removed from later bottom outlet conduits in the series because these components will tend to require more time and not sink as fast. In this way, each bottom outlet conduit in series can represent a beef product having a range of fat that is different to the range of fat of the beef product that is extracted through every other bottom outlet conduit. A tubular conduit with ten bottom outlet conduits, for example, can thusly produce ten beef product streams wherein each of the ten streams will have a different percentage of fat than every other stream. By the end of the tubular conduit 1008, mostly or all of the heavy components comprising lean beef will have been removed from the bottom series of outlet conduits, and the remainder of the contents comprising carbon dioxide and light components 1012 will be removed from top outlet conduit 1010 located on the upper section of the tubular conduit 1008, since the lighter components will tend to rise and float in the liquid.

Figure 6:
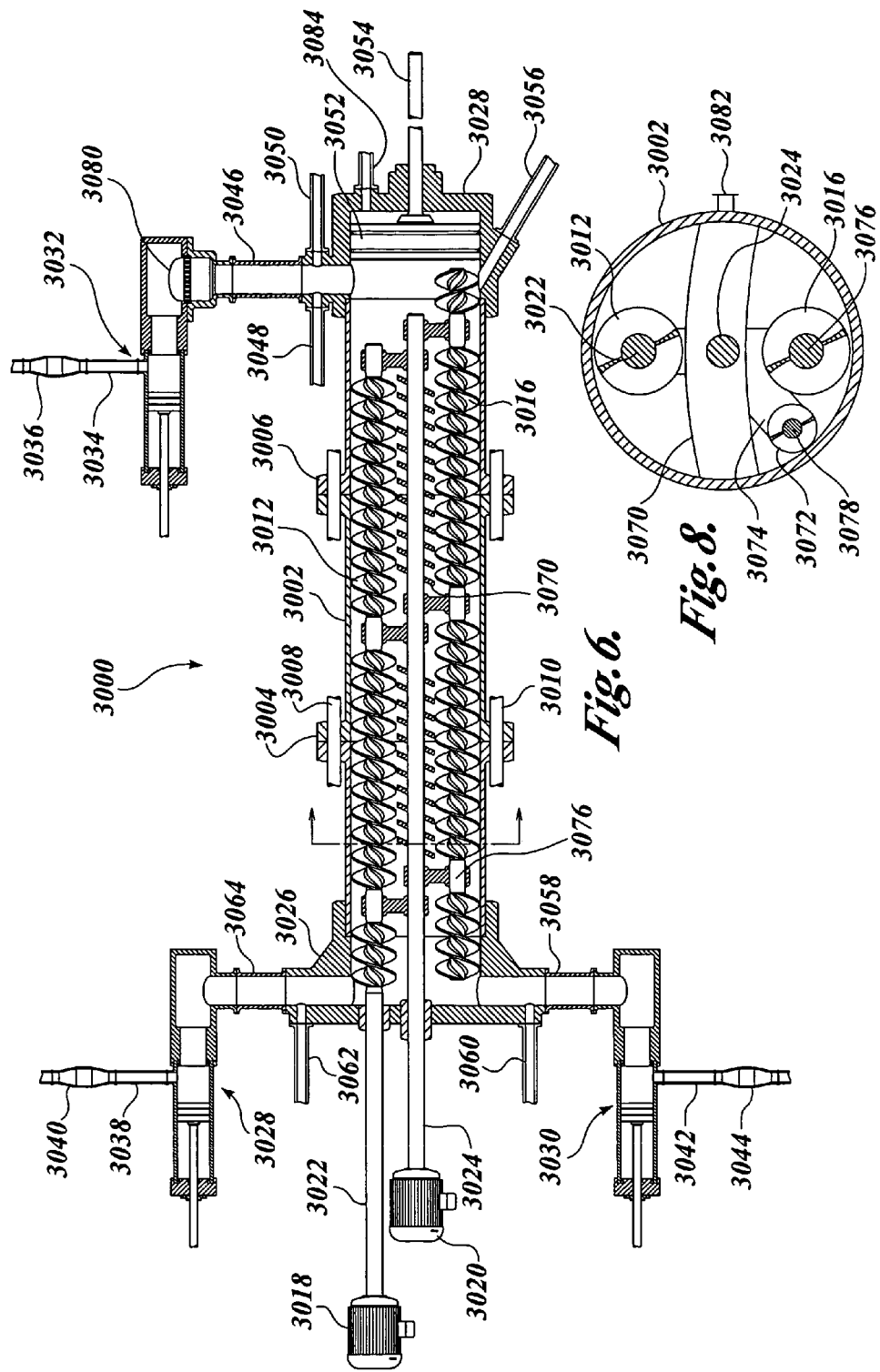
FIG. 6 is an illustration of an apparatus for separating fat from a material according to the present invention.

Referring now to FIG. 6, an apparatus 3000 for the separation of fat from a material is illustrated. As with the previous embodiments, the apparatus 3000 causes separation of fat from a material according to the propensity of the fat to rise in a liquid that has a density greater than the density of fat.

The apparatus 3000 includes a conduit 3002 that is comprised of multitude individual conduit sections joined at flanges 3004 and 3006. In addition to joining the separate conduit sections, flanges 3004 and 3006 can also serve as lugs to support the entire apparatus on structural rod members 3008 and 3010. The conduit 3002 provides ample interior room to house a plurality of rotating augers 3012 and 3016 and a third auger that is not shown in FIG. 6. Augers 3012 and 3016 are of the spiraling helical screw type that are connected to drive units 3018 and 3020. The number of drive units can be varied depending on whether the augers are meshed to one another with gears or can be operated independently of each other. In the embodiment shown, drive units 3018 and 3020 respectively are connected to drive shafts 3022 and 3024. Drive shaft 3022 is connected to the auger 3012 and the drive shaft 3024 is connected to a more complex moving frame 3074 that connects to the auger 3016 and the auger 3072 not shown in FIG. 6, but shown in FIG. 8. Shaft 3024 that is in the center of conduit 3002 can have slats 3070 fixed on the shaft 3024 at a canted angle, when viewed from the side.

Referring to FIG. 8, the cross-sectional illustration of the apparatus 3000 of FIG. 6 is illustrated. As shown in FIG. 8, auger 3012 is preferably located at the upper interior region of the conduit 3002. Auger 3012 is fixed to operate in the position that is shown in FIG. 8. The drive shaft 3024 is shown attached to a representative slat 3070. Slat 3070 extends approximately the diameter of conduit 3002, but divides the conduit into two respective lower and upper regions that are divided by the series of slats mounted on shaft 3024. Drive shaft 3024 is configured not to completely rotate through 360°, but rather moves in a back and forth manner to impart a pendulum motion to slats 3070 and frame 3074. Frame 3074 thus causes the series of slats 3070 and augers 3016 and 3072 to sweep back and forth in the lower region of conduit 3002. However, the drive shaft 3024 is configured to rotate augers 3016 and 3072 completely, while simultaneously rocking back and forth through a small arc in the bottom region of conduit 3002. Accordingly, when filled with a liquid containing materials that include light fat and heavy lean beef components, the light components will float towards the upper region of the conduit 3002 wherein they are transferred the length of the conduit 3002 by auger 3012. The heavier components will sink or settle towards the bottom of the conduit 3002 and be transferred the length of conduit 3002 by augers 3016 and 3072. Simultaneously thus, the light components will be transferred along the length of and in the upper region of the conduit 3002 by the upper auger 3012, and the heavier components that settle towards the bottom of the conduit 3002 will be transferred along the length of and in the lower region of the conduit 3002 by augers 3016 and 3072. Because augers 3016 and 3072 sweep back and forth in the lower region of conduit 302, any materials in this area are further gently agitated, which may cause some breaking apart of materials and these material may then be induced to either float or sink. In this way, components that neither readily rise towards the upper region nor settle towards the lower region might be gently induced to rise or sink by such action. Slats like 3070 that divide the upper and the lower regions in conduit 3002 encourage the materials to cross from one region into the other according to their specific weight. In this way, the collection of light and heavy components will be increased by the agitating action of the central frame mechanism that sweeps the bottom region of conduit 3002, simultaneously operating augers 3016 and 3072.

Referring again to FIG. 6, each end of the conduit 3002 is attached to an end cap having various input locations for materials, liquids, and gases. End cap 3026 that is at the end where drive units 3018 and 3020 are located, includes two output conduits that connect to the interior of the conduit 3002 and each outlet is further connected to a pump of the positive displacement type. End cap 3026 has an upper conduit 3064 connected to pump 3028 and a lower conduit 3058 connected to pump 3030. Operation of the pumps 3028, 3030 and also pump 3032 will be described in greater detail below.

As shown in FIG. 6, the end cap 3028 that is opposite to the drive units 3018 and 3020 is connected to conduit 3046 that is further connected to pump 3032. Pump 3032 can pump material with fat to be separated. Pumps 3028 and 3030 pump the separated fat (tallow) and reduced fat material (beef low in fat), respectively.

Figure 7:
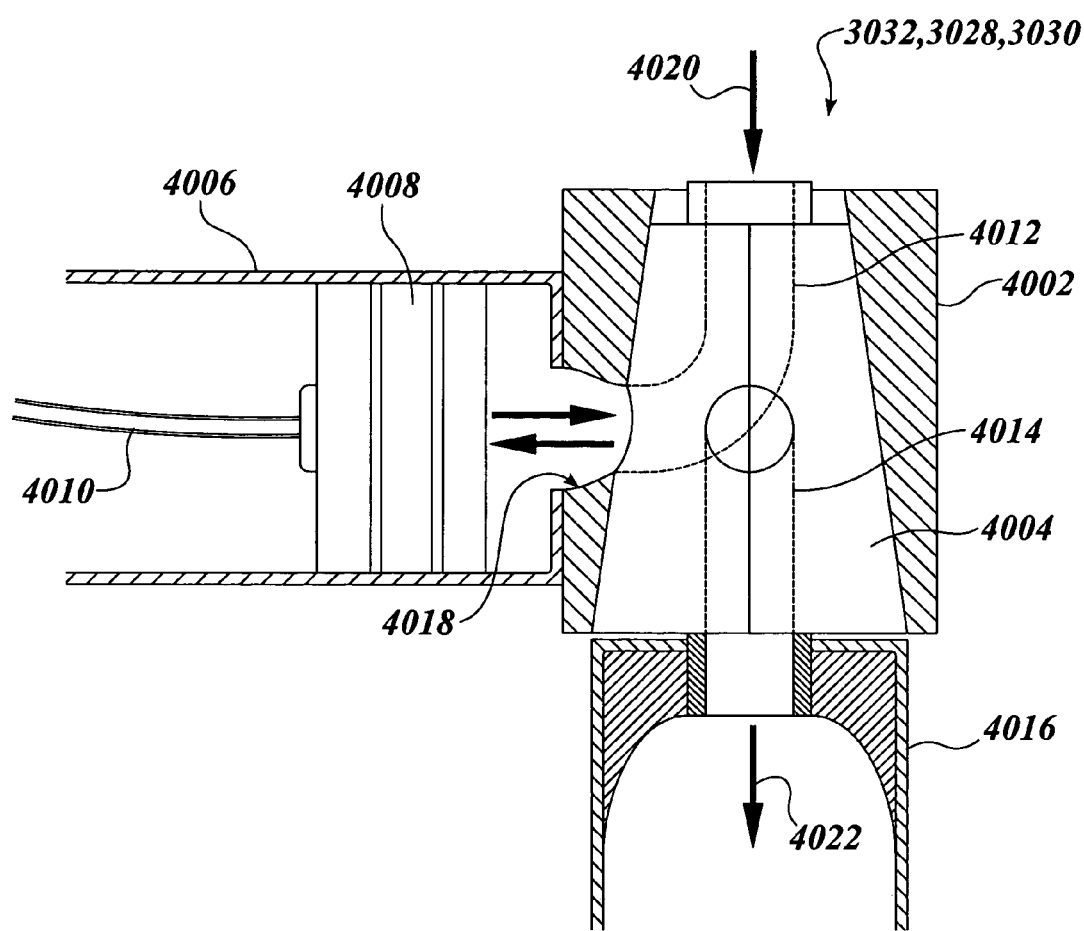
FIG. 7 is an illustration of an apparatus for pumping materials used in the apparatus of FIG. 6.

Referring now to FIG. 7, a detailed illustration of a representative pump that can be used for pumps 3028, 3030 and 3032 or pumps of any other fat separation embodiment described above. Each of the three separate pumps is similar in operation and contain the same basic pump components. Pumps 3028, 3030, and 3032 are considered positive displacement pumps. As shown in FIG. 7, the positive displacement pump includes a piston cylinder 4006 housing a reciprocating piston 4008. The reciprocating piston 4008 is connected to the piston rod 4010 that moves the piston 4008 within piston cylinder 4006 in a linear motion. The piston cylinder 4006 is connected to the pump body 4002. Pump body 4002 includes a hollow central core containing a plug 4004. The hollow central core of the pump body 4002 is provided with the plug 4004 that articulates minimally at least through 90°. Plug 4004 is shaped substantially like the hollow core of the pump body 4002. Plug 4004 is movable between a first and second position. Plug 4004 includes two hollow throats 4012 and 4014 for ingress and egress of pumpable material.

In the first position, as shown in FIG. 7, the piston 4008 is at the top of the piston stroke. Plug 4004 has been rotated so that ingress throat 4012 is aligned with pump aperture 4018 that leads to piston cylinder interior. Piston 4008 can move away from pump body 4002 to draw pumpable material into piston cylinder 4006. Piston 4008 at one point will reach the limit of travel and begin to reverse in the reciprocal direction. Plug 4004 will rotate 90° (or 270°) to align egress throat 4014 with pump aperture 4018 so that as piston 4008 moves towards pump body 4002 material that fills piston cylinder 4006 will be expelled through egress throat 4014 in direction of arrow 4022. As shown in FIG. 7, the piston 4008 has reached the top of the stroke, the plug 4004 has rotated 90° or 270° to align the ingress throat 4012 to pump aperture 4018 and will receive material once piston 4008 begins to move. Being at the top of the stroke means that the piston has moved the farthest in the direction towards the pump body 4002. After completion of the stroke, the piston 4008 will reverse direction and head in the opposite direction, i.e., to the bottom of the stroke. Being at the bottom of the stroke means that the piston 4008 is the furthest distance away from the pump body 4002. As the piston 4008 is pulled away from the pump body, provided that the plug 4004 has rotated so that the ingress throat 4012 is aligned with the pump body aperture 4018, material that is located in the supply conduit is drawn in the direction of arrow 4020 through the ingress throat 4012 in the plug 4004 and into the piston cylinder 4006. The volume of the piston cylinder 4006 can be enlarged to a volume that can accommodate even the largest single piece of boneless beef. In this manner, a primal can remain whole, otherwise rotation of plug 4004 with a primal not fully within piston cylinder 4006 will cleanly cut a primal as plug 4004 rotates. Such cutting of a whole primal may reduce the eventual value of the product that is produced thereby. When the piston 4008 reaches the bottom of the stroke, i.e., when the piston can go no further from the pump body 4002, the plug 4004 rotates through 90° or 270° to align the egress conduit 4014 with the pump body aperture 4018 so that the piston 4008 can move towards the pump body 4002 and the top of the stroke. The material within the piston cylinder 4006 will be expelled through the pump body aperture 4018 and through the egress throat 4014 that is provided in the plug 4004, and through conduit 4016. Using a positive displacement pump, as described, material can be provided at the required pressures to maintain carbon dioxide in the liquid phase. Furthermore, positive displacement pumps can be used to introduce or remove materials from the conduit 3002 that is shown in FIG. 6.

Returning now to FIG. 6, one such positive displacement pump 3032 is provided at the end cap 3028 for the introduction of a material comprising fat and lean beef to the conduit 3002. Material is supplied in conduit 3034 to the pump 3032. Measuring device 3036 can be provided in the conduit 3034 for the analysis of flow rate, fat content, lean beef content and water content. Material comprising fat passes through pump 3032 into a grinder 3080 and the ground material passes into the conduit 3046 connecting the grinder 3080 to the end cap 3028. Conduit 3046 connects the pump 3032 with the end cap 3028 so as to deliver material with fat into the interior of the conduit 3002. Conduit 3046 has inlet conduits 3048 and 3050. Conduits 3048 and 3050 can be used to provide water, salts, carbon monoxide, carbon dioxide, liquid and/or gas to the material that is introduced through the conduit 3046.

The end cap 3028 also functions as a piston cylinder for piston 3052. Piston 3052 is connected to a piston rod 3054 that penetrates through the center of end cap 3028. Piston 3052 is controlled to distend into the conduit 3002 and thereby raise the pressure within conduit 3002. The more the piston 3052 is extended into the conduit 3002, the higher the pressure within the conduit 3002 that is achieved. Conversely, by withdrawing the piston 3052, i.e., moving the piston 3052 away from the conduit 3002, the lower the pressure within the conduit 3002. Accordingly, by using piston 3052, the pressure within the conduit 3002 can be controlled within a predetermined set point or range and thus be used to control the density of liquid carbon dioxide within conduit 3002. Such density controls the separation of materials into light components that rise in the liquid and heavy components that settle to the bottom of the liquid. Since the pH of liquid carbon dioxide is further related to the pressure, one further use of piston 3052 is to raise and lower the pH of liquid carbon dioxide to a level that can injure any microorganisms on the material within conduit 3002. Such rapid raising and lowering of pH can create extremes in pH changes that can shock microorganisms and render them inactive. Using the positive displacement pumps 3028, 3030, and 3032 as described above, enables a substantially positive pressure seal that is required to maintain pressure at a controllable set point or range. Conduit 3084 is intended to be used to provide a gas or liquid compatible with the contents within conduit 3002. The gas or liquid provided through conduit 3084 is approximately at the same pressure as within conduit 3002. In this manner, the high pressure within conduit 3002 will not cause the material within conduit 3002 to seep by the piston rings of piston 3052 and be lost. Conditions within conduit 3002 can be at a pressure of about 250 psia (1724 kPa) to about 3000 psia (20680 kPa) and at a temperature of about 30° F. (−4° C.) to about 50° F. (10° C.).

The material with fat is introduced into the interior of conduit 3002, along with liquid carbon dioxide that fills the conduit 3002, and, optionally, water and some other agent, the light components in the material, perhaps comprising predominantly fat, will rise towards the upper region within the interior of the conduit 3002 and be carried by the auger 3012 toward the upper exit conduit 3064 on end cap 3026. Concurrently, heavier components, perhaps comprising predominantly lean beef, or at the very least, less fat than the light components that rise towards the surface, will settle or sink towards the lower region within the interior of the conduit 3002 and will be carried the length of the conduit 3002 by the augers 3016 and 3072. Some material that is of intermediate density and that will neither readily rise nor sink will be agitated and induced into either rising or sinking by the action of the sweeping arc motion of augers 3016 and 3072 as described above. The density of the liquid carbon dioxide can either be adjusted, raised or lowered, so that the material will now have the opportunity to either rise or sink. A feed conduit 3056 is provided at the lower section of conduit 3002 and at the end cap 3028. Conduit 3056 is preferably for the introduction of water in or near the vicinity of the lower region within conduit 3002. Generally, the density of liquid carbon dioxide will be controlled such that the density of the liquid carbon dioxide will be slightly less than the density of water so that any water introduced through feed conduit 3056 will substantially remain in the lower region of the conduit 3002 and travel the length of the conduit 3002 by the auger 3016. Introduction of water at such location, it is believed, will displace any liquid carbon dioxide that has found its way into voids or interstices that are within any material that sinks towards the bottom of the conduit 3002. As both the water and material are transferred along the conduit 3002 by augers 3016 and 3072, water will have a tendency to replace any liquid carbon dioxide that may have found its way into any voids in the material. At the end of the augers 3016 and 3072 at the end cap 3026, the material and the water, rather than the liquid carbon dioxide, will be collected by conduit 3058 that is attached to the end cap 3026. A feed conduit 3060 is connected to the end cap 3026 in the vicinity of conduit 3058. One purpose for having conduit 3060 is for the introduction of water that will further remove any liquid carbon dioxide that has found its way into the voids and interstices of the material collected by the conduit 3058. Pump 3030 will then remove the heavy components from the conduit 3058 in a manner described in association with FIG. 7. The heavy components will be expelled from pump 3030 through conduit 3042. Conduit 3042 includes a measuring device 3044 that can measure the flow rate, fat content, lean beef content and moisture content of the material passing through conduit 3042.

One further purpose for conduit 3056 is to receive recycled liquid carbon dioxide that can be collected from conduit 3002 and recycled to conduit 3056. A horizontal nozzle 3082 (shown in FIG. 8) located on conduit 3002 can be used to remove liquid carbon dioxide from conduit 3002 and recycle the liquid carbon dioxide through conduit 3056.

Light components that have been transferred through the upper region of the conduit 3002 will be collected at the surface of the liquid carbon dioxide using conduit 3064 that is connected to the end cap 3026. A feed conduit 3062 is provided in the conduit 3064. Feed conduit 3062 is for the introduction of gaseous carbon dioxide that is capable of removing some of the liquid carbon dioxide that has found its way into the voids or interstices of the light components that are removed by conduit 3064. The light components in conduit 3064 are transferred in a manner described in association with FIG. 7 by pump 3028 and delivered to the respective delivery location via conduit 3038. Conduit 3038 includes a measuring device 3040 that can measure the fat content, lean beef content, water content and flow rate of the material passing through conduit 3038.

The separated lean beef and fat (tallow), separated by any of the embodiments of FIGS. 1, 3, 4, 5 and 6 can be directed into separate streams to storage vessels and the fat may be retained in steel tanks at a suitable temperature until required for further processing or used to manufacture other products. For example, the fat (tallow) can be heated to a temperature that will cook the collagen and connective tissue contained therein. After extraction of substantially all fat, the residue can be used as a flavoring. This flavoring may be ground into a powder or paste and combined with beef patties thereby imparting a desirable flavor similar to that of roast beef.

In another aspect of the present invention, fuel, such as bio-diesel, can be derived from the fat (tallow) that is separated. Tallow contained with a blend of ground beef comprising, for example about 40% tallow and about 60% lean beef, can be removed after grinding and separation as described herein above by the numerous embodiments. After separating, the tallow can be treated to remove all collagen and connective tissue contained therein and the fat dried by heating to a temperature of approximately 160 degrees F. to remove substantially all water contained therein. The heated, dehydrated, fat can then be transferred into a pressure vessel and combined with methanol and sodium hydroxide. Alternatively calcium hydroxide can be used prior to storing the bio-diesel. After storage for a period of time, the bio-diesel may be used to drive a diesel engine.

Bio-diesel is graded according to the properties it possesses. A typical grade that can be manufactured from fat is B100 bio-diesel, which can then be used as a fuel to drive a modified or stock diesel engine. Such diesel engines can be manufactured by Cummins of Indiana. Cummins engines are used for driving ships or generators used to produce electricity. Fuel such as B100 bio-diesel may be used as an energy source to drive any suitable type of adapted diesel engine; including, but not limited to a two-stroke, compression ignition, reciprocating piston engine, such as a four-stroke V8 or V16 engine. One suitable engine is the engine known as the Electronic Variable Out-put Reciprocating Piston (EVORP) engine that is capable of using many types of liquid or gaseous fuels, including the B100 bio-diesel fuel described above. The EVORP engine is described in numerous patent applications, including U.S. Provisional Patent Application Nos. 60/483,311, filed Jun. 27, 2003; 60/536,770, filed Jan. 15, 2004; and 60/545,841, filed Feb. 18, 2004. All of these applications are incorporated herein by reference in their entirety for all purposes. B100 fuel, derived from fat, has advantages not present in most other types of fuels that are derived from petroleum. The exhaust gases that are produced by burning bio-diesel are more environmentally friendly and it is believed that such exhaust gases do not damage the environment as much as the exhaust gases and particulate matter that is produced when fuels derived from petroleum oil are burned.

The embodiments of the apparatus used in the separation of fat described above refer to a pressure vessel (FIGS. 1, 3 and 4) or a pressure conduit (FIGS. 5 and 6). A further aspect of all embodiments of the separation apparatus is that such apparatus pressure treatment vessel or conduit can be arranged with an inlet port and outlet port, each one connected directly to a positive displacement pump, respectively for loading and unloading of materials for the vessel or conduit. Liquid carbon dioxide is provided, at a controlled temperature and pressure, for example at 39° F. and at 600 psig, in sufficient quantity to completely fill the treatment pressure vessel or conduit. The quantity of liquid carbon dioxide is controlled such that when other materials, such as boneless beef, are pumped in the vessel or conduit, a corresponding volume of liquid equal to the volume of materials injected into the treatment pressure vessel or conduit is extracted. Correspondingly, if treated materials are removed from the treatment pressure vessel or conduit, then a volume of liquid carbon dioxide is injected into the vessel or conduit to compensate for the volume of materials extracted therefrom.

The purpose of this particular aspect that may be employed by all embodiments of the apparatus described above is to enable the thawing of frozen, ground block-beef by combining with a second and fresh stream of non-frozen beef. Controlled quantities of ground frozen block-beef are combined with a controlled quantity of fresh ground beef, wherein the temperature of the frozen beef is, for example, 20° F., and the temperature of the fresh beef is, for example, 39° F., which result in a third combined stream that is then transferred by a positive displacement pump into a treatment pressure vessel or conduit filled with liquid carbon dioxide. The temperature of the liquid carbon dioxide within the treatment pressure vessel or conduit is maintained at the desired final temperature of the materials extracted from the treatment pressure vessel or conduit. The purpose of this is to enable the combining of selected quantities of frozen ground beef and selected quantities of fresh ground beef and adjusting the temperature of the combined frozen and fresh ground beef to a final temperature by maintaining the temperature of the liquid carbon dioxide.

In some regions, it is common practice to buy and slaughter cattle during a season of the year when the price of these animals is relatively low, and after slaughtering and processing, the boneless beef harvested from these slaughtered animals is frozen and stored until required, which may be at a time of the year when the prevailing market value of beef is higher than it was at the time when the animals were slaughtered and beef harvested there from. A problem associated with frozen beef is the inability to perform in-line fat analysis with measuring equipment, such as with guided microwave spectrometry (GMS). The fat content and lean beef content cannot be measured when water contained in the beef is frozen. It is therefore necessary to defrost the frozen beef prior to measuring the composition of the beef. One aspect of the present invention provides for the thawing of frozen ground or block beef with the use of liquid carbon dioxide blended with the selected quantities of ground frozen and fresh beef, which is then agitated within a treatment pressure vessel or conduit. Therefore, it is desirable to provide the pressure vessel or conduit with a agitator mounted therein and driven by an external drive motor. Such agitator may comprise an impeller mounted with a shaft passing directly through an exterior wall of the treatment pressure vessel or conduit which is connected to a variable speed drive motor such as an electric servo drive motor. In this way, a quantity of beef representing a ratio, for example 20% by weight of a stream of beef is blended with a quantity representing 80% by weight of a stream of beef and then transferred together into a treatment pressure vessel or conduit with liquid carbon dioxide approximately three to five times the combined total quantity of the frozen and fresh ground beef. Ground beef is retained within the treatment pressure vessel or conduit until an equilibrated temperature of, for example 35° F., has been achieved. Liquid carbon dioxide can be transferred through a heat exchanger and recycled, under pressure, into the treatment pressure vessel or conduit and after remaining therein for a period of time, extracted and transferred in a loop back through the heat exchanger. In this way, after ground beef has been equilibrated at a selected temperature such as between, for example 34° F. and 38° F., it can be extracted from the pressure vessel or conduit and transferred through a GMS fat analysis and measuring device, thereby enabling the accurate measurement of the fat and lean content of the ground beef.

Figure 9:
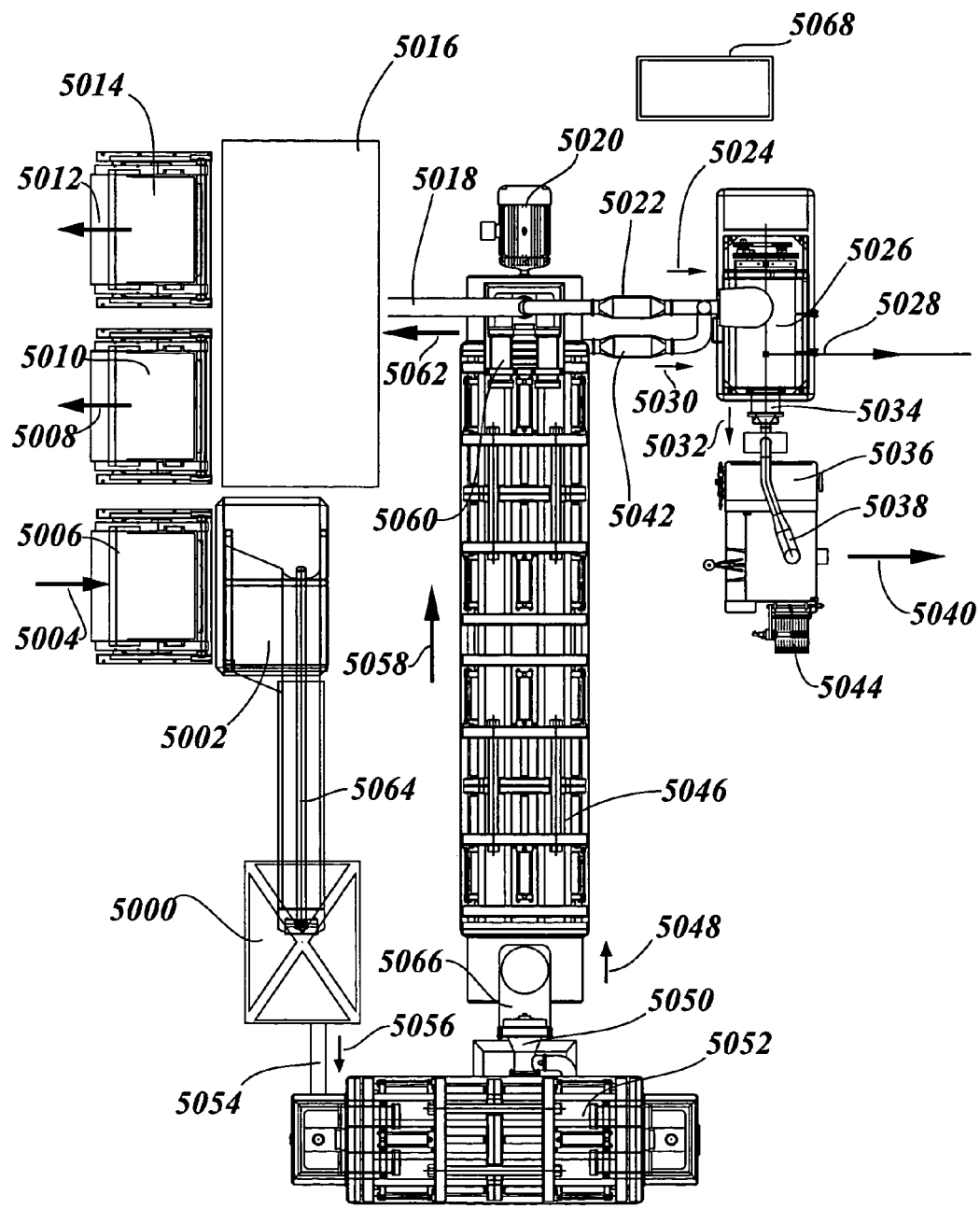
FIG. 9 is an illustration in plan view of equipment installed in a refrigerated room wherein the equipment is integrated together in a manner that provides for the automated processing of boneless beef trim to reduce the tallow and fat content thereof.

Referring now to FIG. 9 a plan view of several apparatus components are installed in a refrigerated room and integrated together so as to provide a processing system for treating boneless beef to reduce pathogens and any bacteria that may be present there with. The boneless beef is then ground and transferred directly into a separating vessel and thereafter measured and packaged according to an automated computer controlled process as desired. Boneless beef or trim in typical palletized transporting methods is transferred into combo dumper 5006 in the direction shown by arrow 5004. Combo dumper such as can be supplied by Cozzini, 5006, elevates and inverts pallet size bin into elevator spreader 5002 and a screw elevates boneless beef and trim along elevator 5064 and deposits into pump 5000. Elevator 5064 is enclosed and may be flooded with a selected gas such as carbon dioxide. Pump 5000 transfers boneless beef via conduit 5054 in the direction shown by arrow 5056 into twin cylinder cone valve pump on the underside of anti-microbial treatment cylinder 5052. Treatment cylinder 5052 comprises a pressure vessel. After treatment and reduction of any pathogen population that may be present with the trim is reduced, a second twin cylinder cone pump transfers treated boneless beef and trim through grinder 5050 via connection 5066 in the direction shown by arrow 5048 and into a trim separating system 5046. During the separation process trim is transferred in the direction shown by arrow 5058 and the separated streams can then be transferred via third and fourth high pressure pumps such as 5060. GMS fat measuring manifold 5042 analyzes boneless high lean content beef in the direction shown by arrow 5032 and into pre-blender 5026. If necessary, fat can be transferred in the direction shown by arrow 5024 via GMS measuring device 5022 and into pre-blender 5026. Excess carbon dioxide is transferred by exhaust duct represented by arrow 5028. Motor 5020 is provided to drive impellers installed as required within separation vessel 5046. Excess tallow extracted from stream of trim is transferred via conduit 5018 in the direction shown by arrow 5062 into barrier pouch packaging system 5016. Barrier pouch system 5016 is arranged with two pallet loading devices 5014 and 5010 such that when one barrier pouch is being filled by direct connection with a filling head, the other pallet location can be unloaded and a fresh empty barrier pouch located in the pallet loading arrangement. As arranged in FIG. 9, all tallow extracted from trim is transferred into pouch loading system 5016. However it can be rearranged such that high lean content boneless beef can be transferred via barrier pouch loading system 5016 and into barrier pouches located in pallet loading section 5014 and 5010 and then removed there from in the direction shown by arrows 5012 and 5008. A chub packaging machine 5036 is located as shown and in direct communication with pre-blender 5026 via transfer pump 5034 and transfer conduit 5038 such that coarse or fine ground beef, after blending in pre-blender 5026, can be transferred in the direction shown by arrow 5032 via conduit 5038 after transfer pump 5034 provides the pumping means to enable the transfer of boneless beef via conduit 5038 in the direction shown by arrow 5032 and through a metal detection device arranged around a section of conduit 5038. Chubs are formed from a roll of packaging material 5044 and after sealing, transferred there from in the direction shown by arrow 5040. A control panel 5068 is conveniently located to enable a qualified operator to interface with the apparatus shown in FIG. 9 and control it in a manner required so as to enable the most efficient production and processing of beef. The equipment shown in FIG. 9 is arranged to process a quantity equal to approximately 30,000 lbs. per hour.

While the preferred embodiment of the invention has been illustrated and described, it will be appreciated that various changes can be made therein without departing from the spirit and scope of the invention.

The invention claimed is:

1. A method for separating beef, comprising:
reducing beef into small beef components;
combining the beef components with a liquid in a vessel, wherein the liquid is a blend of carbon dioxide and water, wherein the pH of the liquid is reduced to less than 4;
mixing the beef and liquid in the vessel;
allowing beef components comprising predominantly fat to rise to the top of the liquid and beef components comprising predominantly lean beef to settle to the bottom of the liquid;
removing the beef components comprising predominantly fat from the liquid; and
removing the beef components comprising predominantly lean beef from the liquid.

2. The method of claim 1, further comprising collecting liquid generally above the components comprising predominantly lean beef and below the components comprising predominantly fat and processing the collected liquid with a centrifuge to separate fat components from lean beef components.

3. The method of claim 1, wherein the liquid is maintained at temperature in the range of about 24° F. (−4.4° C.) to about 110° F. (43.3° C.) and a pressure in the range of about 280 psia (1931 kPa) to about 2500 psia (17237 kPa).

4. A method for separating fat from a material, comprising:
reducing a material to smaller material pieces, wherein the material pieces include components comprising predominantly fat and components comprising predominantly lean beef;
adjusting the temperature of the material pieces to a range from about 24° F. (−4.4° C.) to about 110° F. (43.3° C.);
combining the material pieces with a liquid in a vessel, wherein the density of the liquid is greater than or equal to the density of the components comprising predominantly fat and less than or equal to the density of the components comprising predominantly lean beef, wherein the liquid is a blend of carbon dioxide and water, wherein the pH of the liquid is reduced by adjusting the pressure in the vessel;
allowing the components comprising predominantly fat to rise in the liquid forming a first stratum in the liquid;
allowing the components comprising predominantly lean beef to settle in the liquid forming a second stratum in the liquid; and
collecting the second stratum comprising components comprising predominantly lean beef.

5. The method of claim 4, wherein the liquid comprises carbon monoxide.

6. The method of claim 4, further comprising removing liquid from the vessel from the space between the first and the second stratum, and processing the liquid with a centrifuge to separate fat components and lean meat components from the liquid.

7. The method of claim 4, further comprising agitating the contents of the vessel.

8. The method of claim 4, further comprising injecting liquid carbon dioxide at the bottom of the vessel.

9. The method of claim 4, wherein the carbon dioxide is about 3 to about 5 times the weight of the material.

10. The method of claim 1, wherein the liquid is a mixture of vaporized carbon dioxide and water.

11. The method of claim 4, wherein the liquid is a mixture of vaporized carbon dioxide and water.

\* \* \* \* \*

UNITED STATES PATENT AND TRADEMARK OFFICE
CERTIFICATE OF CORRECTION

PATENT NO.        : 7,666,456 B2                                    Page 1 of 1
APPLICATION NO.   : 10/868394
DATED             : February 23, 2010
INVENTOR(S)       : Anthony J. M. Garwood It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1408 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,666,456 B2 | Page 1 of 1 |
| APPLICATION NO. | : 10/868394 | |
| DATED | : February 23, 2010 | |
| INVENTOR(S) | : A. J. M. Garwood | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1408 days.

| COLUMN | LINE | |
|---|---|---|
| 20 | 12 | after "predominantly fat" insert --,-- |
| 20 | 16 | "at temperature" should read --at a temperature-- |

Signed and Sealed this
Twenty-eighth Day of December, 2010

David J. Kappos
*Director of the United States Patent and Trademark Office*